US012684624B2

(12) United States Patent
Jiang

(10) Patent No.: US 12,684,624 B2
(45) Date of Patent: Jul. 14, 2026

(54) RANDOM ACCESS METHOD AND APPARATUS, AND COMMUNICATION DEVICE AND COMPUTER-READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 364 days.

(21) Appl. No.: 18/290,131

(22) PCT Filed: May 12, 2021

(86) PCT No.: PCT/CN2021/093429
§ 371 (c)(1),
(2) Date: Nov. 9, 2023

(87) PCT Pub. No.: WO2022/236748
PCT Pub. Date: Nov. 17, 2022

(65) Prior Publication Data
US 2024/0260089 A1     Aug. 1, 2024

(51) Int. Cl.
*H04W 74/0833* (2024.01)
*H04W 28/02* (2009.01)
*H04W 72/566* (2023.01)

(52) U.S. Cl.
CPC ... *H04W 74/0833* (2013.01); *H04W 28/0278* (2013.01); *H04W 72/569* (2023.01)

(58) Field of Classification Search
CPC ............. H04W 28/0278; H04W 72/20; H04W 72/569; H04W 74/08; H04W 74/0833
See application file for complete search history.

(56) References Cited

U.S. PATENT DOCUMENTS

| | | | |
|---|---|---|---|
| 2012/0093106 A1* | 4/2012 | Dong .................... | H04W 48/18 370/329 |
| 2018/0192434 A1* | 7/2018 | Lee ...................... | H04W 28/12 |
| 2020/0084796 A1 | 3/2020 | Zhao et al. | |

(Continued)

FOREIGN PATENT DOCUMENTS

| | | |
|---|---|---|
| CN | 108271270 A | 7/2018 |
| CN | 108391469 A | 8/2018 |

(Continued)

OTHER PUBLICATIONS

International Search Report of PCT/CN2021/093429 dated Dec. 20, 2021 with English translation, (4p).

(Continued)

*Primary Examiner* — Kashif Siddiqui

(74) *Attorney, Agent, or Firm* — Arch & Lake LLP; Hao Tan; Shen Wang

(57) ABSTRACT

The present disclosure relates to a random access method and apparatus, and a communication device and a computer-readable storage medium. The method comprises: in response to determining that a buffer status report (BSR) is triggered by a terminal, determining whether the terminal satisfies a triggering condition for random access; and in response to determining that the terminal satisfies the triggering condition for random access, triggering a random access process.

16 Claims, 5 Drawing Sheets determining whether the terminal satisfies the triggering condition for random access in response that the buffer status report BSR is triggered by the terminal — S101 triggering a random access process in response that the terminal satisfies the triggering condition for random access — S102

(56) References Cited

U.S. PATENT DOCUMENTS

| | | | | |
|---|---|---|---|---|
| 2021/0337625 A1* | 10/2021 | Tsai | .................... | H04W 76/30 |
| 2022/0053575 A1* | 2/2022 | He | .................... | H04W 56/004 |
| 2023/0397198 A1* | 12/2023 | Turtinen | ............. | H04B 17/328 |

FOREIGN PATENT DOCUMENTS

| | | | |
|---|---|---|---|
| CN | 111294975 A | 6/2020 |
| CN | 111479331 A | 7/2020 |
| WO | 2021022508 A1 | 2/2021 |
| WO | 2021064101 A1 | 4/2021 |
| WO | 2021064150 A1 | 4/2021 |

OTHER PUBLICATIONS

Asia Pacific Telecom, FGI, "BSR over 2-step RACH" 3GPP TSG-RAN WG2 Meeting #113 bis electronic online, R2-2101833, Apr. 12-20, 2021, (3p).

Asia Pacific Telecom, FGI, "Enhancements on RACH in NTN" 3GPP TSG-RAN WG2 Meeting #113 electronic online, R2-2103263, Jan. 25, Feb. 5, 2021, (4p).

Nokia, "Discussion on UL scheduling enhancements for NTN", 3GPP TSG-RAN WG2 Meeting #113bis Electronic, R2-2103232, Elbonia, Apr. 12-20, 2021, (4p).

Nokia, "Discussion on UL scheduling enhancements for NTN", 3GPP TSG-RAN WG2 Meeting #114 Electronic, R2-2105414, Elbonia, May 19-27, 2021, (4p).

First Office Action issued to CN Application No. 202180001468.0 dated Jul. 4, 2022, (9p).

Chinese Notice of Allowance issued to CN Application No. 202180001468.0 dated Oct. 30, 2023, (3p).

* cited by examiner

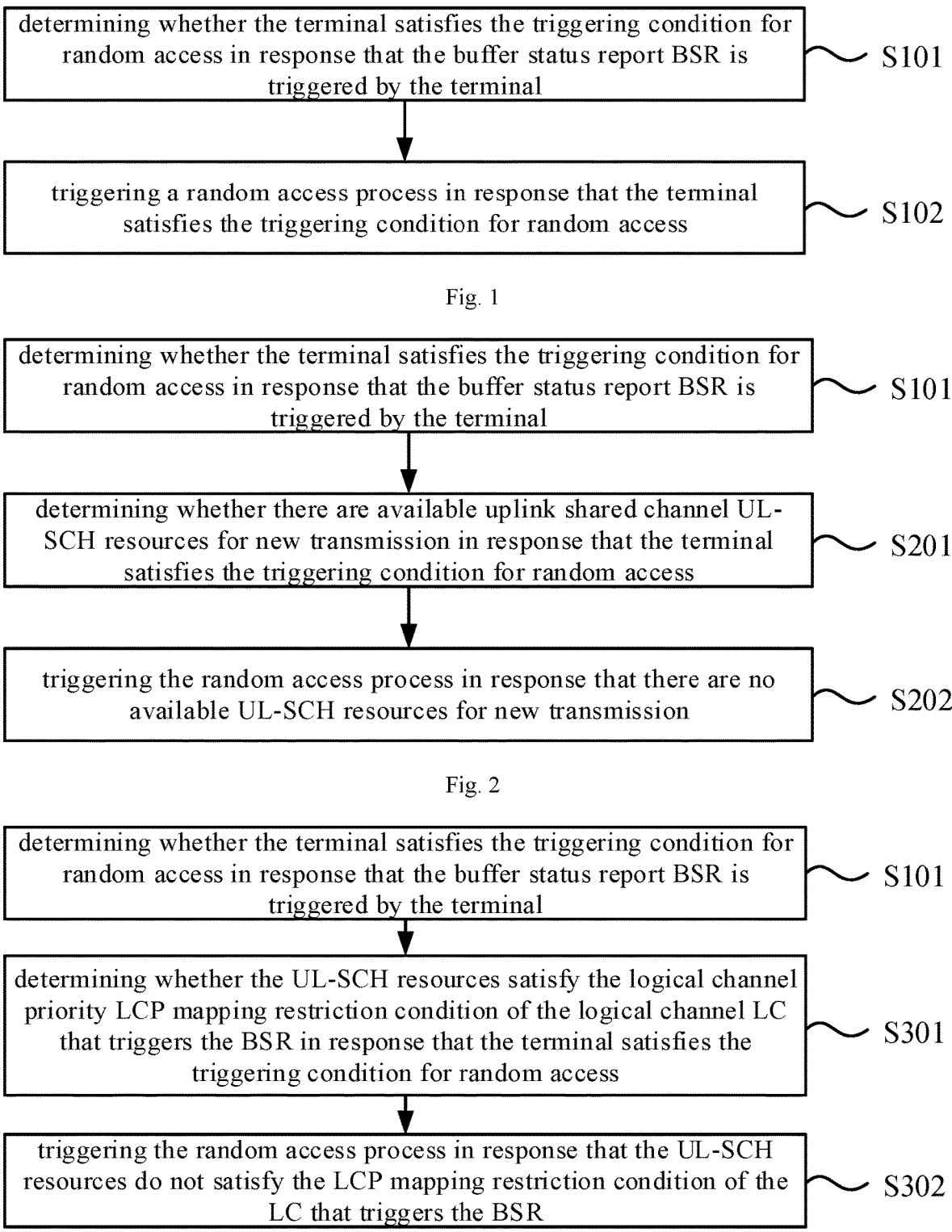

| | |
|---|---|
| determining whether the terminal satisfies the triggering condition for random access in response that the buffer status report BSR is triggered by the terminal | S101 |
| triggering a random access process in response that the terminal satisfies the triggering condition for random access | S102 |

Fig. 1

| | |
|---|---|
| determining whether the terminal satisfies the triggering condition for random access in response that the buffer status report BSR is triggered by the terminal | S101 |
| determining whether there are available uplink shared channel UL-SCH resources for new transmission in response that the terminal satisfies the triggering condition for random access | S201 |
| triggering the random access process in response that there are no available UL-SCH resources for new transmission | S202 |

Fig. 2

| | |
|---|---|
| determining whether the terminal satisfies the triggering condition for random access in response that the buffer status report BSR is triggered by the terminal | S101 |
| determining whether the UL-SCH resources satisfy the logical channel priority LCP mapping restriction condition of the logical channel LC that triggers the BSR in response that the terminal satisfies the triggering condition for random access | S301 |
| triggering the random access process in response that the UL-SCH resources do not satisfy the LCP mapping restriction condition of the LC that triggers the BSR | S302 |

Fig. 3

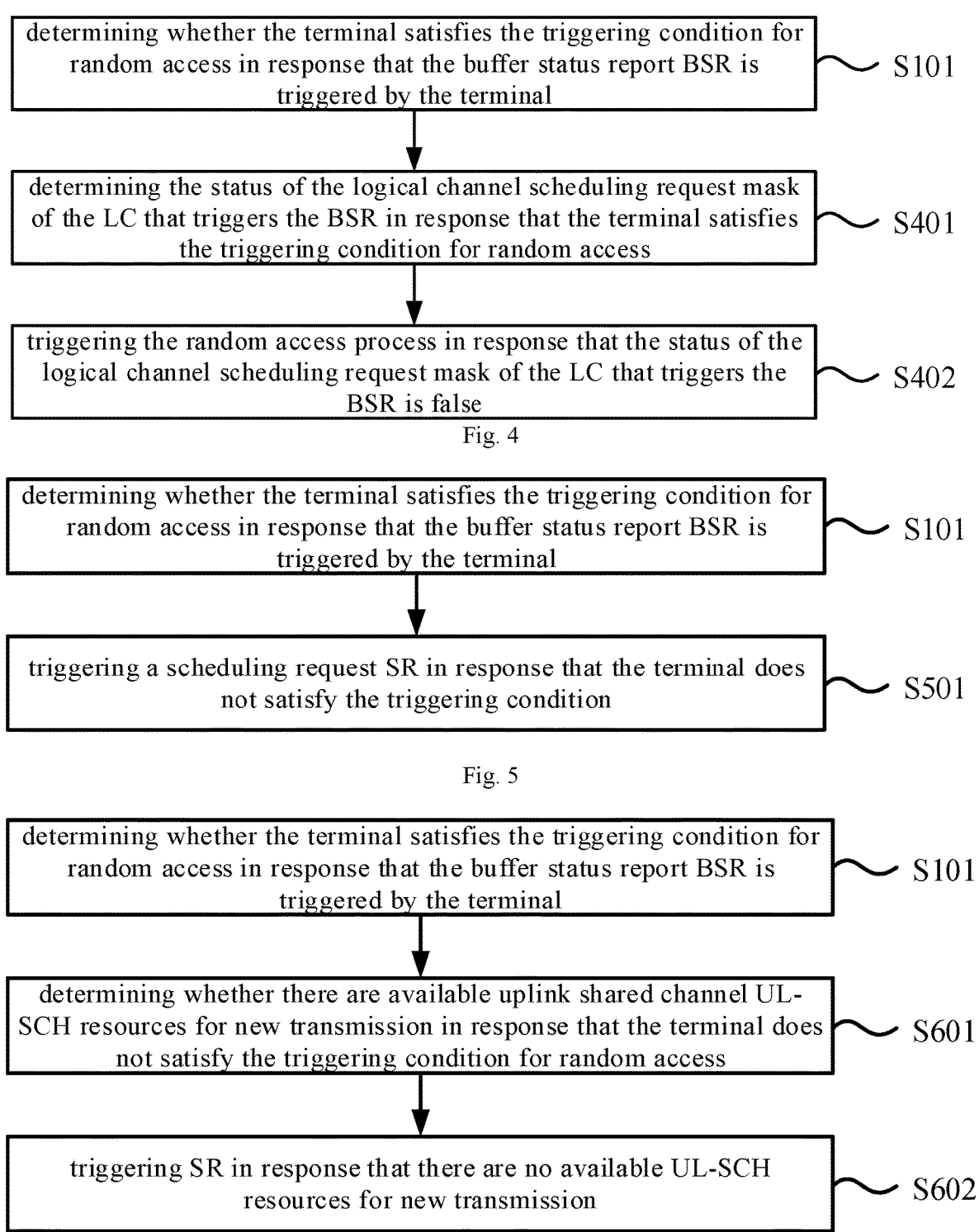

determining whether the terminal satisfies the triggering condition for random access in response that the buffer status report BSR is triggered by the terminal          S101 determining the status of the logical channel scheduling request mask of the LC that triggers the BSR in response that the terminal satisfies the triggering condition for random access          S401 triggering the random access process in response that the status of the logical channel scheduling request mask of the LC that triggers the BSR is false          S402

Fig. 4 determining whether the terminal satisfies the triggering condition for random access in response that the buffer status report BSR is triggered by the terminal          S101 triggering a scheduling request SR in response that the terminal does not satisfy the triggering condition          S501

Fig. 5 determining whether the terminal satisfies the triggering condition for random access in response that the buffer status report BSR is triggered by the terminal          S101 determining whether there are available uplink shared channel UL-SCH resources for new transmission in response that the terminal does not satisfy the triggering condition for random access          S601 triggering SR in response that there are no available UL-SCH resources for new transmission          S602

Fig. 6

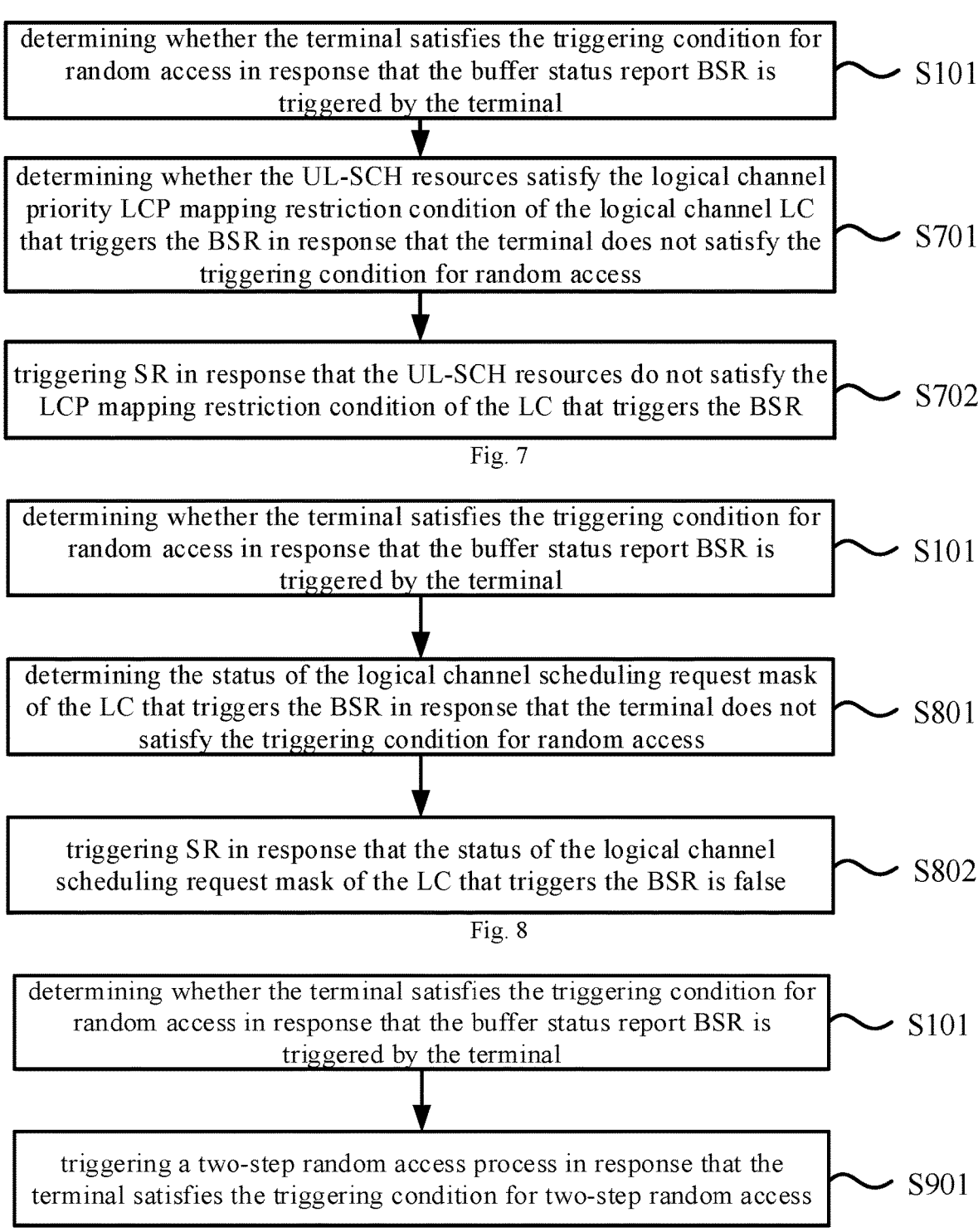

determining whether the terminal satisfies the triggering condition for random access in response that the buffer status report BSR is triggered by the terminal    S101 determining whether the UL-SCH resources satisfy the logical channel priority LCP mapping restriction condition of the logical channel LC that triggers the BSR in response that the terminal does not satisfy the triggering condition for random access    S701 triggering SR in response that the UL-SCH resources do not satisfy the LCP mapping restriction condition of the LC that triggers the BSR    S702

Fig. 7 determining whether the terminal satisfies the triggering condition for random access in response that the buffer status report BSR is triggered by the terminal    S101 determining the status of the logical channel scheduling request mask of the LC that triggers the BSR in response that the terminal does not satisfy the triggering condition for random access    S801 triggering SR in response that the status of the logical channel scheduling request mask of the LC that triggers the BSR is false    S802

Fig. 8 determining whether the terminal satisfies the triggering condition for random access in response that the buffer status report BSR is triggered by the terminal    S101 triggering a two-step random access process in response that the terminal satisfies the triggering condition for two-step random access    S901

Fig. 9

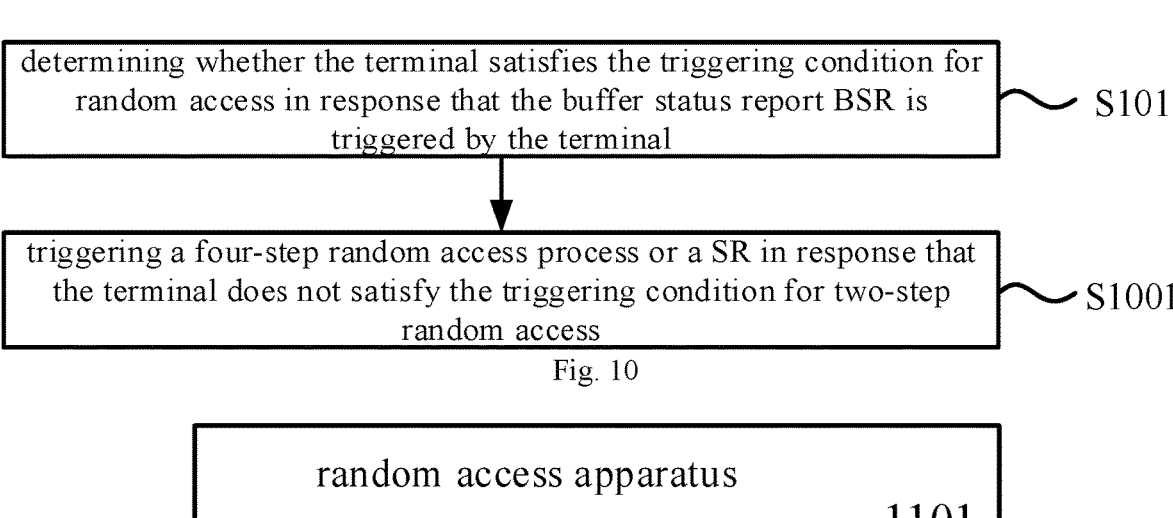

determining whether the terminal satisfies the triggering condition for random access in response that the buffer status report BSR is triggered by the terminal          ∽ S101 triggering a four-step random access process or a SR in response that the terminal does not satisfy the triggering condition for two-step random access          ∽ S1001

Fig. 10 random access apparatus processing module          ⌐ 1101

Fig. 11

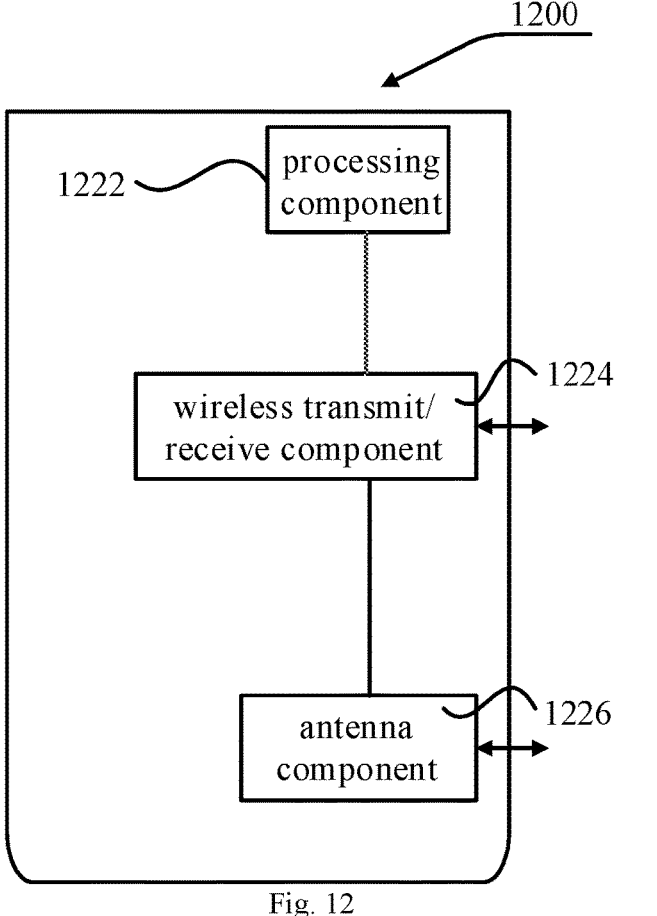

1200

1222 ∽          processing component

1224 wireless transmit/ receive component

1226 antenna component

Fig. 12

RANDOM ACCESS METHOD AND APPARATUS, AND COMMUNICATION DEVICE AND COMPUTER-READABLE STORAGE MEDIUM

CROSS REFERENCE TO RELATED APPLICATION(S)

The present application is a U.S. national phase application of International Application No. PCT/CN2021/093429 filed on May 12, 2021, the content of which is incorporated herein by reference in its entirety for all purposes.

TECHNICAL FIELD

The present disclosure relates to the field of communication technology, and specifically, relates to a random access method, a random access apparatus, a communication device, and a computer-readable storage medium.

BACKGROUND

When the terminal triggers a Buffer Status Report (BSR), if there are no available Uplink Shared Channel (UL-SCH) resources for sending the BSR, a Scheduling Request (SR) may be triggered to request uplink shared channel resources; and if there are no available uplink control channel resources for sending the SR, the terminal may initiate a Random Access (RA) process.

In the existing procedure for initiating a random access process, the SR may be further triggered subsequent to the triggered BSR, and only after that, the random access process can be triggered. There are many steps in this procedure, and each step takes a certain amount of time, which makes it difficult to satisfy the requirements for allowing services with lower latencies.

SUMMARY

In view of above, embodiments of the present disclosure propose a random access method, a random access apparatus, a communication device, and a computer-readable storage medium, to solve technical problems in the relevant art.

According to a first aspect of embodiments of the present disclosure, a random access method is proposed, which is performed by a terminal. The method includes steps of: determining whether the terminal satisfies the triggering condition for random access in response to determining that a buffer status report (BSR) is triggered by the terminal; and triggering a random access process in response to determining that the terminal satisfies the triggering condition for random access.

In an embodiment, the step of triggering the random access process includes: determining whether there are available uplink shared channel (UL-SCH) resources for new transmission; and triggering the random access process in response to determining that there are no available UL-SCH resources for new transmissions.

In an embodiment, there are available UL-SCH resources for new transmission, and the step of triggering the random access process includes: determining whether the UL-SCH resources satisfy the logical channel priority (LCP) mapping restriction condition of the logical channel (LC) that triggers the BSR; and triggering the random access process in response to determining that the UL-SCH resources do not satisfy the LCP mapping restriction condition of the LC that triggers the BSR.

In an embodiment, the terminal is configured with a configured uplink grant resource, and the step of triggering the random access process includes: determining the status of the logical channel scheduling request mask of the LC that triggers the BSR; and triggering the random access process in response to determining that the status of the logical channel scheduling request mask is false.

In an embodiment, the method further includes: triggering a scheduling request (SR) in response to determining that the terminal does not satisfy the triggering condition.

In an embodiment, the step of triggering the SR includes: determining whether there are available uplink shared channel (UL-SCH) resources for new transmission; and triggering the SR in response to determining that there are no available UL-SCH resources for new transmission.

In an embodiment, there are available UL-SCH resources for new transmission, and the step of triggering the SR includes: determining whether the UL-SCH resources satisfy the logical channel priority (LCP) mapping restriction condition of the logical channel (LC) that triggers the BSR; and triggering the SR in response to determining that the UL-SCH resources do not satisfy the LCP mapping restriction condition of the LC that triggers the BSR.

In an embodiment, the terminal is configured with a configured uplink grant resource, and the step of triggering the SR includes: determining the status of the logical channel scheduling request mask of the LC that triggers the BSR; and triggering the SR in response to determining that the status of the logical channel scheduling request mask of the LC that triggers the BSR is false.

In an embodiment, the triggering condition for random access includes at least one of the following: the LC that triggers the BSR is configured to allow random access or two-step random access to be triggered when the BSR is triggered; the LC that triggers the BSR is configured to disable the uplink hybrid automatic repeat request (HARQ) retransmission; the quality of service of the LC that triggers the BSR does not satisfy the specified quality of service; the terminal-specific round-trip delay of the terminal in the non-terrestrial network (NTN) does not satisfy the delay condition; the distance between the terminal and at least one of a satellite, a reference point, and a base station in the NTN does not satisfy the distance condition; and the time-domain and/or frequency-domain compensation performed by the terminal satisfies the compensation requirement.

In an embodiment, the triggering condition for random access includes a triggering condition for two-step random access.

In an embodiment, the step of triggering the random access process in response to determining that the terminal satisfies the triggering condition for random access includes: triggering a two-step random access process in response to determining that the terminal satisfies the triggering condition for two-step random access.

In an embodiment, the method further includes: triggering a four-step random access process or a SR in response to determining that the terminal does not satisfy the triggering condition for two-step random access.

In an embodiment, the triggering condition for two-step random access includes at least one of the following: the LC that triggers the BSR is configured to trigger a two-step random access process when the BSR is triggered; the LC that triggers the BSR is configured to disable the uplink hybrid automatic repeat request (HARQ) retransmission; the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance from the terminal to at least one of a satellite, a reference point, and a base station in the NTN does not satisfy the distance condition; the time-domain and/or frequency-domain compensation performed by the terminal satisfies the compensation requirement; and the terminal is configured with resources for two-step random access.

In an embodiment, the terminal is in a disconnected state, and the step of triggering the two-step random access process in response to determining that the terminal satisfies the triggering condition for two-step random access includes: triggering the two-step random access process, in response to determining that the terminal satisfies the triggering condition for two-step random access, and that the access class for triggering random access satisfies the target condition; and otherwise, triggering a four-step random access process.

In an embodiment, the target condition includes at least one of the following: it is determined according to a broadcast message from the base station that the access class is configured to adopt two-step random access; and the Access Stratum of the terminal determines according to the instruction from the Non-Access Stratum that the access class is configured to adopt two-step random access.

In an embodiment, the triggering condition for two-step random access includes at least one of the following: the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance from the terminal to at least one of a satellite, a reference point, and a base station in the NTN does not satisfy the distance condition; the time-domain and/or frequency-domain compensation performed by the terminal satisfies the compensation requirement; and it is determined according to the broadcast message from the base station that there are available resources for two-step random access.

In an embodiment, the BSR is a regular BSR.

According to a second aspect of embodiments of the present disclosure, a random access apparatus is proposed, including: a processing module, configured to determine whether the triggering condition for random access is met in response to determining that the buffer status report (BSR) is triggered. The processing module is further configured to trigger a random access process in response to determining that the triggering condition for random access is met.

According to a third aspect of embodiments of the present disclosure, a communication device is proposed, including: a processor; and a memory having a computer program stored thereon. When the computer program is executed by the processor, the random access method described in any of the above embodiments is implemented.

According to a fourth aspect of embodiments of the present disclosure, a computer-readable storage medium is proposed for storing a computer program. When the computer program is executed by a processor, steps of the random access method described in any of the above embodiments are implemented.

According to embodiments of the present disclosure, when the BSR is triggered by the terminal, if the terminal satisfies the triggering condition for random access, it can directly trigger a random access process without triggering the scheduling request SR. Accordingly, the procedure for triggering the random access process is simplified. This helps to reduce the delay of random access to satisfy the needs of services requiring lower latencies.

BRIEF DESCRIPTION OF THE DRAWINGS

In order to more clearly illustrate the technical solutions in embodiments of the present disclosure, the drawings needed to be used in the description of the embodiments will be briefly introduced below. It is noted that the drawings in the following description are only some embodiments of the present disclosure. For those of ordinary skill in the art, other drawings may be obtained based on these drawings without any creative efforts.

FIG. 1 is a schematic flow chart of a random access method according to an embodiment of the present disclosure.

FIG. 2 is a schematic flow chart of another random access method according to an embodiment of the present disclosure.

FIG. 3 is a schematic flow chart of yet another random access method according to an embodiment of the present disclosure.

FIG. 4 is a schematic flow chart of yet another random access method according to an embodiment of the present disclosure.

FIG. 5 is a schematic flow chart of yet another random access method according to an embodiment of the present disclosure.

FIG. 6 is a schematic flow chart of yet another random access method according to an embodiment of the present disclosure.

FIG. 7 is a schematic flow chart of yet another random access method according to an embodiment of the present disclosure.

FIG. 8 is a schematic flow chart of yet another random access method according to an embodiment of the present disclosure.

FIG. 9 is a schematic flow chart of yet another random access method according to an embodiment of the present disclosure.

FIG. 10 is a schematic flow chart of yet another random access method according to an embodiment of the present disclosure.

FIG. 11 is a schematic block diagram of a random access apparatus according to an embodiment of the present disclosure.

FIG. 12 is a schematic block diagram of a base station according to an embodiment of the present disclosure.

DETAILED DESCRIPTION OF THE EMBODIMENTS

Figure 13:
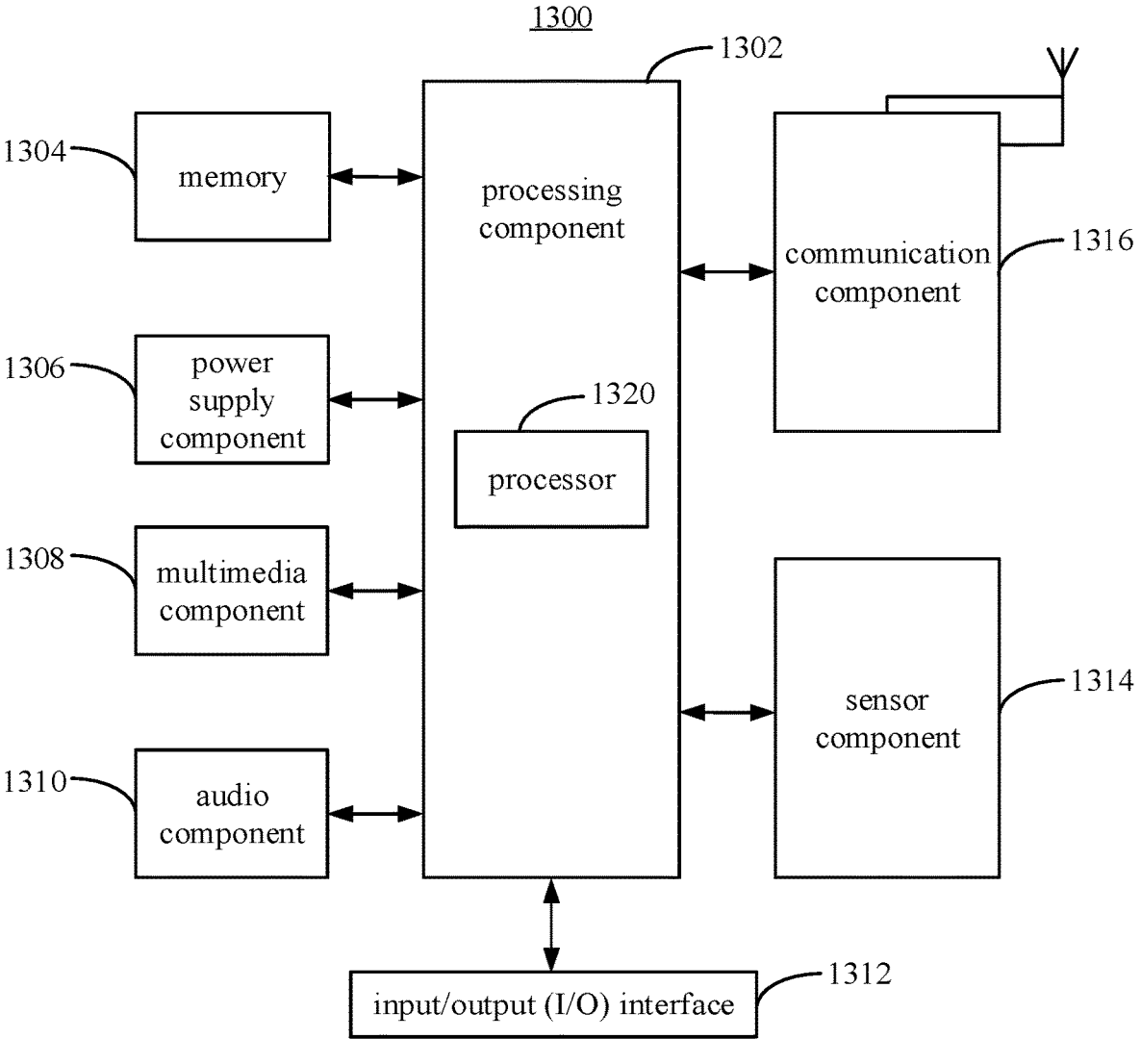
FIG. 13 is a schematic block diagram of a device for random access according to an embodiment of the present disclosure.

The technical solutions in the embodiments of the present disclosure will be clearly and completely described below with reference to the accompanying drawings in the embodiments of the present disclosure. It is noted that the described embodiments are only some of the embodiments of the present disclosure, rather than all of the embodiments. Based on the embodiments described in the present disclosure, all other embodiments obtained by those of ordinary skill in the art without creative efforts fall within the protection scope of the present disclosure.

The terminology used in the embodiments of the present disclosure is for the purpose of describing specific embodiments only, and is not intended to limit the embodiments of the present disclosure. As used in the embodiments of the present disclosure and the appended claims, the singular forms "a", "an", and "the" are intended to include the plural forms as well, unless it is clearly indicated otherwise in context. It will also be understood that the term "and/or" as used herein refers to, and includes, any and all possible combinations of one or more of the associated items as listed.

It should be understood that although the terms first, second, third, etc. may be used to describe various information in the embodiments of the present disclosure, the information should not be limited to these terms. These terms are only used to distinguish information of the same type from each other. For example, without departing from the scope of the embodiments of the present disclosure, the first information may also be called second information, and similarly, the second information may also be called first information. Depending on the context, the word "if" used herein may be interpreted as "when" or "while" or "in response to".

For the purpose of simplicity and ease of understanding, when characterizing size relationships, the present application may use terms like "greater than" or "less than", "higher than" or "lower than". But for those skilled in the art, it can be understood that the term "greater than" also covers the meaning of "greater than or equal to", the term "less than" also covers the meaning of "less than or equal to", the term "higher than" also covers the meaning of "higher than or equal to", and the term "lower than" also covers the meaning of "lower than or equal to".

FIG. 1 is a schematic flow chart of a random access method according to an embodiment of the present disclosure. The random access method shown in this embodiment may be applied to a terminal, which includes, but is not limited to, mobile phone, tablet computer, wearable device, sensor, Internet of Things device, and other communication device. The terminal may serve as a user equipment to communicate with a base station. The base station includes, but is not limited to, a base station in a communication system, such as 4G base station, 5G base station, and 6G base station.

In some embodiments, the terminal may be a terminal in a terrestrial network. In the terrestrial network, the terminal may communicate directly with a terrestrial base station.

In some embodiments, the terminal may be a terminal in a non-terrestrial network (NTN). In the non-terrestrial network, the terminal may communicate with a ground base station through an aerial device, including, but not limited to, satellite, aerial platform, unmanned aerial vehicle, and other device. Taking the satellite as an example, the satellite may send a signal from the terminal to the ground base station, and may also send a signal from the ground base station to the terminal. The processing methods performed by the satellite on the signal include, but are not limited to, a regeneration mode and a transparent transmission mode.

As shown in FIG. 1, the random access method may include the following steps.

Step S101, determining whether the terminal satisfies the triggering condition for random access in response to determining that the buffer status report (BSR) is triggered by the terminal.

Step S102, triggering a random access process in response to determining that the terminal satisfies the triggering condition for random access.

According to embodiments of the present disclosure, when the BSR is triggered by the terminal, if the terminal satisfies the triggering condition for random access, it can directly trigger the random access process without triggering the scheduling request SR. Accordingly, the procedure for triggering the random access process is simplified. This helps to reduce the delay of random access to satisfy the needs for services requiring lower latencies.

In an embodiment, the random access process triggered by the terminal may be a four-step random access 4-STEP RA process or a two-step random access 2-STEP RA process.

In an embodiment, the four-step random access process may include four steps. First, the terminal sends a first message Msg1 for random access to the base station, and the first message Msg1 mainly contains the preamble. After receiving Msg1, the base station sends a second message Msg2 for random access to the terminal. Msg2 may also be called a random access response (RAR for short), which mainly contains the identifier of the preamble and the uplink resource allocation information. After receiving Msg2, the terminal sends a third message Msg3 for random access to the base station. The third message Msg3 mainly contains the identifier of the terminal. After receiving Msg3, the base station may send a fourth message Msg4 for random access to the terminal. Msg4 is mainly used for contention resolution.

In an embodiment, the two-step random access process may include two steps. First, the terminal sends a random access message MsgA to the base station. MsgA contains the preamble for random access and the identifier of the terminal, and may also include the physical uplink shared channel (PUSCH) payload. After receiving MsgA, the base station may send a random access message MsgB to the terminal. MsgB contains the identification information of the terminal and the contention resolution information.

In an embodiment, the BSR is a regular BSR. It should be noted that in all embodiments of the present disclosure, the BSR triggered by the terminal may be a regular BSR or a non-regular BSR.

The triggering condition for the regular BSR includes, but is not limited to, the following: when new data arrives on a logical channel with a higher priority than the existing logical channel containing transmittable data; and when new data arrives, but the terminal does not have any logical channel containing transmittable data.

In addition, the BSR triggered by the terminal may be one BSR or multiple BSRs. For example, the BSRs may be triggered by different logical channels (LCs).

FIG. 2 is a schematic flow chart of another random access method according to an embodiment of the present disclosure. As shown in FIG. 2, the triggering of the random access process includes steps as follows.

Step S201, determining whether there are available uplink shared channel (UL-SCH) resources for new transmission.

Step S202, triggering the random access process in response to determining that there are no available UL-SCH resources for new transmission.

In an embodiment, the reason for triggering BSR is generally the need for transmitting new data. Therefore, whether to trigger a random access process may be determined based on whether new data can be successfully transmitted. For example, it may be determined whether there are available UL-SCH resources for new transmission (for transmitting new data). If there are no available UL-SCH resources for new transmission, new data cannot be transmitted smoothly. Thus, the random access process may be triggered to establish a communication connection with the base station, and the available UL-SCH resources for new transmission are obtained for sending BSR and/or new data.

FIG. 3 is a schematic flow chart of yet another random access method according to an embodiment of the present disclosure. As shown in FIG. 3, there are available UL-SCH resources for new transmission, and the triggering of the random access process includes the following steps.

Step S301, determining whether the UL-SCH resources satisfy the logical channel priority (LCP) mapping restriction condition of the logical channel (LC) that triggers the BSR.

Step S302, triggering the random access process in response to determining that the UL-SCH resources do not satisfy the LCP mapping restriction condition of the LC that triggers the BSR.

In an embodiment, when there are available UL-SCH resources for new transmission, in order to ensure that new data can be transmitted smoothly, it may be determined whether the UL-SCH resources satisfy the logical channel priority (LCP) mapping restriction condition of the logical channel (LC) that triggers the BSR. If the mapping restriction condition is met, new data can be transmitted smoothly. If the mapping restriction condition is not met, BSR and/or new data cannot be transmitted smoothly, and a random access process may be triggered.

FIG. 4 is a schematic flow chart of yet another random access method according to an embodiment of the present disclosure. As shown in FIG. 4, the terminal is configured with a configured uplink grant resource, and the triggering of the random access process includes the following steps.

Step S401, determining the status of the logical channel scheduling request mask of the LC that triggers the BSR.

Step S402, triggering the random access process in response to determining that the status of the logical channel scheduling request mask (logical Channel SR-Mask) of the LC that triggers the BSR is false.

In an embodiment, when the terminal is configured with a configured uplink grant resource, if the status of the logical channel scheduling request mask of the LC that triggers BSR is false, the terminal generally cannot successfully transmit new data, and thus the random access process may be triggered.

FIG. 5 is a schematic flow chart of yet another random access method according to an embodiment of the present disclosure. As shown in FIG. 5, the method also includes the following steps.

Step S501, triggering a scheduling request (SR) in response to determining that the terminal does not satisfy the triggering condition.

In an embodiment, when the terminal does not satisfy the triggering condition for random access, the terminal may choose to trigger SR. Accordingly, if there are available uplink resources (such as physical uplink control channel resources) for sending SR, BSR may be sent directly by requesting resources through SR, which is helpful to ensure the smooth transmission of BSR.

It should be noted that the terminal does not satisfy the triggering condition for random access, which may mean that the terminal does not satisfy the triggering condition for two-step random access. In this case, the terminal may choose to trigger SR or trigger a four-step random access process. Taking the selection of triggering SR as an example, the four-step random access process will not be triggered, thereby not occupying random access channel resources, which is helpful to avoid the congestion of random access channel resources.

FIG. 6 is a schematic flow chart of yet another random access method according to an embodiment of the present disclosure. As shown in FIG. 6, the triggering of SR includes the following steps.

Step S601, determining whether there are available uplink shared channel (UL-SCH) resources for new transmission;

Step S602, triggering SR in response to determining that there are no available UL-SCH resources for new transmission.

In an embodiment, the reason for triggering BSR is generally the need for transmitting new data. Thus, whether to trigger SR may be determined based on whether new data can be successfully transmitted. For example, it may be determined whether there are available UL-SCH resources for new transmission (for transmitting new data). If there are no available UL-SCH resources for new transmission, new data cannot be transmitted smoothly. Thus, SR may be adopted so that the available UL-SCH resources for new transmission can be requested through SR for sending BSR and/or new data.

FIG. 7 is a schematic flow chart of yet another random access method according to an embodiment of the present disclosure. As shown in FIG. 7, there are available UL-SCH resources for new transmission, and the triggering of SR includes the following steps.

Step S701, determining whether the UL-SCH resources satisfy the logical channel priority (LCP) mapping restriction condition of the logical channel (LC) that triggers the BSR.

Step S702, triggering SR in response to determining that the UL-SCH resources do not satisfy the LCP mapping restriction condition of the LC that triggers the BSR.

In an embodiment, when there are available UL-SCH resources for new transmission, in order to ensure that new data can be transmitted smoothly, it may be determined whether the UL-SCH resources satisfy the logical channel priority (LCP) mapping restriction condition of the logical channel (LC) that triggers the BSR. If the mapping restriction condition is met, new data can be transmitted smoothly. If the mapping restriction condition is not met, new data cannot be transmitted smoothly. Thus, SR may be used so that the UL-SCH resources, satisfying the LCP mapping restriction condition of the LC that triggers the BSR, can be requested through SR, thereby smoothly transmitting BSR and/or new data.

FIG. 8 is a schematic flow chart of yet another random access method according to an embodiment of the present disclosure. As shown in FIG. 8, the terminal is configured with a configured uplink grant resource, and the triggering of SR includes the following steps.

Step S801, determining the status of the logical channel scheduling request mask of the LC that triggers the BSR.

Step S802, triggering SR in response to determining that the status of the logical channel scheduling request mask of the LC that triggers the BSR is false.

In an embodiment, when the terminal is configured with a configured uplink grant resource, if the status of the logical channel scheduling request mask of the LC that triggers the BSR is false, the terminal generally cannot successfully transmit new data, and thus the SR may be triggered.

In some embodiments, the triggering condition for random access includes at least one of the following: the LC that triggers the BSR is configured to allow a random access process or a two-step random access process to be triggered when the BSR is triggered; the LC that triggers the BSR is configured to disable the uplink hybrid automatic repeat request (HARQ) retransmission; the quality of service (QOS) of the LC that triggers the BSR does not satisfy the specified quality of service; the terminal-specific round-trip delay of the terminal in a non-terrestrial network (NTN) does not satisfy the delay condition; the distance between the terminal and at least one of a satellite, a reference point, and a base station in the NTN does not satisfy the distance condition; and the time-domain and/or frequency-domain compensation performed by the terminal satisfies the compensation requirement.

In an embodiment, in response to determining that the buffer status report (BSR) is triggered by the terminal, it may be determined whether the LC that triggers the BSR is configured to allow a random access process or a two-step random access process to be directly triggered (that is, without triggering the SR) when the BSR is triggered. If the LC that triggers the BSR is configured to allow a random access process or a two-step random access process to be directly triggered when the BSR is triggered, then the random access process can be triggered. For example, if the LC that triggers the BSR is configured to allow a random access process to be triggered when the BSR is triggered, then you may choose to trigger a two-step random access process or a four-step random access process. For example, if the LC that triggers the BSR is configured to allow triggering of a two-step random access process when the BSR is triggered, then you may choose to trigger a two-step random access process.

In an embodiment, in response to determining that the buffer status report (BSR) is triggered by the terminal, it may be determined whether the LC that triggers the BSR is configured to disable the uplink Hybrid Automatic Repeat request (HARQ) retransmission (UL HARQ retransmission). If the LC that triggers the BSR is configured to disable the uplink hybrid automatic repeat request (HARQ) retransmission, then a random access process can be initiated.

In this case, if the terminal communicates with the base station based on the HARQ mechanism, after the terminal performs uplink transmission, the base station receives the uplink transmission and demodulates it, and then decides whether to schedule the terminal to retransmit based on the demodulation result. Thus, the base station needs to wait for at least one round-trip delay for receiving retransmission from the terminal. For a terminal in the NTN, due to the large round-trip delay of communication between the terminal and the base station, each retransmission will take a long time, thereby requiring a long time for a successful retransmission.

Regarding this situation, some LC may be configured to disable the uplink hybrid automatic repeat request (HARQ) retransmission. Then, the terminal on this LC may not retransmit according to the scheduling by the base station based on the demodulation result of the uplink transmission, but performs uplink blind retransmission. Then, the base station may schedule the terminal to perform uplink blind retransmission on this LC, without waiting for the demodulation result of the uplink transmission, thereby reducing the time required for retransmission and completing the retransmission in a shorter time.

For an LC that is configured to disable the uplink hybrid automatic repeat request (HARQ) retransmission, since this LC is used for uplink blind retransmission, the corresponding uplink resources thereof are generally used for uplink blind retransmission, and there may be no available resources for transmitting the triggered BSR. Thus, a random access process may be triggered to request available resources for transmitting the triggered BSR.

In an embodiment, in response to determining that the buffer status report (BSR) is triggered by the terminal, it may be determined whether the quality of service of the LC that triggers the BSR satisfies the specified quality of service. For example, it may be determined whether the specified parameter in the quality of service of the LC that triggers the BSR satisfies the specified parameter in the specified quality of service. For example, if the specified parameter is time delay, it may be determined whether the time delay in the quality of service of the LC that triggers the BSR is less than the time delay in the specified quality of service. If the former is smaller than the latter, it is determined that the quality of service of the LC that triggers the BSR satisfies the specified quality of service. If the former is not smaller than the latter, it is determined that the quality of service of the LC that triggers the BSR does not satisfy the specified quality of service. When the quality of service of the LC that triggers the BSR does not satisfy the specified quality of service, the uplink transmission may be difficult to satisfy the requirements, and thus a random access process may be triggered.

In an embodiment, in response to determining that the buffer status report (BSR) is triggered by the terminal, it may be determined whether the terminal-specific round-trip delay (UE-specific RTT) of the terminal in the non-terrestrial network (NTN) satisfies the delay condition. If the terminal-specific round-trip delay of the terminal in the non-terrestrial network (NTN) does not satisfy the delay condition, for example, if the terminal-specific round-trip delay of the terminal in the non-terrestrial network (NTN) is greater than the preset delay, the communication delay in this case is too large. Then, a random access process may be triggered to re-establish a connection with the base station. The re-established connection helps to reduce the communication delay.

The terminal-specific round-trip delay may refer to the round-trip delay from the terminal to the ground reference point, or the round-trip delay from the terminal to the ground base station, which may be set as needed.

In an embodiment, in response to determining that the buffer status report (BSR) is triggered by the terminal, it may be determined whether the distance from the terminal to at least one of a satellite, a reference point, and a base station in the NTN satisfies the distance condition. If the distance between the terminal and at least one of the satellite, the reference point, and the base station in the NTN does not satisfy the distance condition, for example, if the distance between the terminal and at least one of the satellite, the reference point, and the base station in the NTN is greater than the preset distance, the communication delay in this case is too large. Then, a random access process may be triggered to re-establish a connection with the base station. The re-established connection helps to reduce the communication delay.

In an embodiment, in response to determining that the buffer status report (BSR) is triggered by the terminal, it may be determined whether the time-domain and/or frequency-domain compensation performed by the terminal satisfies the compensation requirement. Taking the time-domain compensation as an example, the terminal may pre-compensate (part or all of) the round-trip delay between the terminal and the base station. If the compensation accuracy reaches the preset accuracy, it may be determined that the compensation satisfies the compensation requirement. In this case, the communication based on the compensated time-domain resources helps to ensure the uplink and downlink synchronization, and the random access process may be performed smoothly. Thus, the random access process may be triggered.

In an embodiment, the triggering condition for random access includes a triggering condition for two-step random access.

FIG. 9 is a schematic flow chart of yet another random access method according to an embodiment of the present disclosure. As shown in FIG. 9, the triggering of the random access process in response to determining that the terminal satisfies the triggering conditions for random access includes the following step.

Step S901, triggering a two-step random access process in response to determining that the terminal satisfies the triggering condition for two-step random access.

In an embodiment, in response to determining that the triggering condition for random access is the triggering condition for two-step random access, and that the terminal satisfies the triggering condition for two-step random access, the two-step random access process may be triggered. Since the two-step random access process requires fewer steps compared to the four-step random access process, it takes less time, which is beneficial to reducing latency.

FIG. 10 is a schematic flow chart of yet another random access method according to an embodiment of the present disclosure. As shown in FIG. 10, the method also includes the following step.

Step S1001, triggering a four-step random access process or a SR in response to determining that the terminal does not satisfy the triggering condition for two-step random access.

In an embodiment, in response to determining that the triggering condition for random access is the triggering condition for two-step random access, and that the terminal does not satisfy the triggering condition for two-step random access, a four-step random access process may be triggered to ensure that the random access process goes smoothly.

In an embodiment, when the triggering condition for random access is the triggering condition for two-step random access, and the terminal does not satisfy the triggering condition for two-step random access, the scheduling request may be triggered. Accordingly, the scheduling request (SR) may be used to directly request resources for sending BSR, which helps to ensure the smooth transmission of BSR and will not trigger the four-step random access process, thereby not occupying random access channel resources and helping to avoid the congestion of random access channel resources.

In an embodiment, the triggering condition for two-step random access includes at least one of the following: the LC that triggers the BSR is configured to trigger a two-step random access process when the BSR is triggered; the LC that triggers the BSR is configured to disable the uplink hybrid automatic repeat request (HARQ) retransmission; the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance from the terminal to at least one of a satellite, a reference point, and a base station in the NTN does not satisfy the distance condition; the time-domain and/or frequency-domain compensation performed by the terminal satisfies the compensation requirement; and the terminal is configured with resources for two-step random access.

In an embodiment, in response to determining that the buffer status report (BSR) is triggered by the terminal, it may be determined whether the LC that triggers the BSR is configured to allow a two-step random access process to be triggered directly (that is, without triggering the SR) when the BSR is triggered. If the LC that triggers the BSR is configured to allow the two-step random access process to be directly triggered when the BSR is triggered, then the two-step random access process may be triggered.

In an embodiment, in response to determining that the buffer status report (BSR) is triggered by the terminal, it may be determined whether the LC that triggers the BSR is configured to disable the uplink hybrid automatic repeat request (HARQ) retransmission. If the LC that triggers the BSR is configured to disable the uplink hybrid automatic repeat request (HARQ) retransmission, a two-step random access process may be triggered.

In this case, if the terminal communicates with the base station based on the HARQ mechanism, after the terminal performs uplink transmission, the base station receives the uplink transmission and demodulates it, and then decides whether to schedule the terminal to retransmit based on the demodulation result. Then, the base station needs to wait for at least one round-trip delay to receive retransmission from the terminal. For a terminal in the NTN, due to the large round-trip delay of communication between the terminal and the base station, each retransmission will take a long time, thereby requiring a long time for a successful retransmission.

Regarding this situation, some LC may be configured to disable the uplink hybrid automatic repeat request (HARQ) retransmission. Then, the terminal on this LC may not retransmit according to the scheduling by the base station based on the demodulation result of the uplink transmission, but performs uplink blind retransmission. Then, the base station may schedule the terminal to perform uplink blind retransmission on this LC, without waiting for the demodulation result of the uplink transmission, thereby reducing the time of retransmission and completing the retransmission in a shorter time.

For an LC that is configured to disable the uplink hybrid automatic repeat request (HARQ) retransmission, since this LC is used for uplink blind retransmission, the corresponding uplink resources thereof are generally used for uplink blind retransmission, and there may be no available resources for transmitting the triggered BSR. Thus, a two-step random access process may be triggered to request the available resources for transmitting the triggered BSR.

In an embodiment, in response to determining that the buffer status report (BSR) is triggered by the terminal, it may be determined whether the quality of service of the LC that triggers the BSR satisfies the specified quality of service. For example, it may be determined whether the specified parameter in the quality of service of the LC that triggers the BSR satisfies the specified parameter in the specified quality of service. For example, if the specified parameter is time delay, it may be determined whether the time delay in the quality of service of the LC that triggers the BSR is less than the time delay in the specified quality of service. If the former is smaller than the latter, it is determined that the quality of service of the LC that triggers the BSR satisfies the specified quality of service. If the former is not smaller than the latter, it is determined that the quality of service of the LC that triggers the BSR does not satisfy the specified quality of service. When the quality of service of the LC that triggers the BSR does not satisfy the specified quality of service, the uplink transmission may be difficult to satisfy the requirements, and thus a two-step random access process may be triggered.

In an embodiment, in response to determining that the buffer status report (BSR) is triggered by the terminal, it may be determined whether the quality of the channel communicating with the base station satisfies the quality condition. For example, when the power of the received signal on the channel is less than the power threshold, it is determined that the channel quality does not satisfy the quality condition. For example, when the downlink pathloss reference is greater than the threshold value msgA-RSRP-Threshold, it may be determined that the channel quality does not satisfy the quality condition. When the channel quality does not satisfy the quality condition, it is difficult to ensure the communication quality of the uplink transmission, and thus a two-step random access process may be triggered.

The power may be characterized by parameters such as Reference Signal Receiving Power (RSRP) and Reference Signal Receiving Quality (RSRQ).

In an embodiment, in response to determining that the buffer status report (BSR) is triggered by the terminal, it may be determined whether the terminal-specific round-trip delay (UE-specific RTT) of the terminal in the non-terrestrial network (NTN) satisfies the delay condition. If the terminal-specific round-trip delay of the terminal in the non-terrestrial network (NTN) does not satisfy the delay condition, for example, if the terminal-specific round-trip delay of the terminal in the non-terrestrial network (NTN) is greater than the preset delay, the communication delay in this case is too large. Then, a two-step random access process may be triggered to re-establish a connection with the base station. The re-established connection helps to reduce the communication delay.

The terminal-specific round-trip delay may refer to the round-trip delay from the terminal to the ground reference point, or the round-trip delay from the terminal to the ground base station, which may be set as needed.

In an embodiment, in response to determining that the buffer status report (BSR) is triggered by the terminal, it may be determined whether the distance of the terminal to at least one of a satellite, a reference point, and a base station in the NTN satisfies the distance condition. If the distance between the terminal and at least one of the satellite, the reference point, and the base station in the NTN does not satisfy the distance condition, for example, if the distance between the terminal and at least one of the satellite, the reference point, and the base station in the NTN is greater than the preset distance, the communication delay in this case is too large. Then, a two-step random access process may be triggered to re-establish a connection with the base station. The re-established connection helps to reduce the communication delay.

In an embodiment, in response to determining that the buffer status report (BSR) is triggered by the terminal, it may be determined whether the time-domain and/or frequency-domain compensation performed by the terminal satisfies the compensation requirement. Taking the time-domain compensation as an example, the terminal may pre-compensate (part or all of) the round-trip delay between the terminal and the base station. If the compensation accuracy reaches the preset accuracy, it may be determined that the compensation satisfies the compensation requirement. In this case, the communication based on the compensated time-domain resources helps to ensure the uplink and downlink synchronization. For a two-step random access process that has higher requirements for the uplink and downlink synchronization, it may proceed smoothly, and thus the two-step random access process may be triggered.

In an embodiment, in response to determining that the buffer status report (BSR) is triggered by the terminal, it may be determined whether the terminal is configured with resources for two-step random access, such as resources dedicated to two-step random access. If the terminal is configured with resources for two-step random access, a two-step random access process may be triggered.

In an embodiment, the terminal is in a disconnected state, such as an idle state or an inactive state, and the triggering of the two-step random access process in response to determining that the terminal satisfies the triggering condition for two-step random access includes the following details.

When the terminal satisfies the triggering condition for two-step random access, and the access class for triggering random access satisfies the target condition, the two-step random access process is triggered. Otherwise, the four-step random access process is triggered.

For a UE in a disconnected state, when the terminal satisfies the triggering condition for two-step random access, it may further determine whether the access class for triggering random access (the BSR is triggered first, and then the random access process is triggered by the BSR) satisfies the target condition. When the access class satisfies the target condition, a two-step random access process may be triggered; and otherwise, a four-step random access process may be triggered.

In an embodiment, the target condition includes at least one of the following: it is determined according to a broadcast message from the base station that the access class is configured to adopt two-step random access; and the Access Stratum (AS) of the terminal determines according to the instruction from the Non-Access Stratum (NAS) that the access class is configured to adopt two-step random access.

In an embodiment, since the terminal is in a disconnected state, the base station generally cannot communicate with the terminal through unicast. Therefore, the terminal may be notified through a broadcast message that the access class is configured to adopt two-step random access. Then, when random access is triggered by the access class, the terminal may trigger a two-step random access process.

In an embodiment, since the terminal is in a disconnected state, the base station generally cannot communicate with the terminal through the Access Stratum. Therefore, the terminal may receive messages at the Non-Access Stratum, such as messages from the core network, and then instruct the Access Stratum through the Non-Access Stratum, for indicating that the access class is configured to adopt two-step random access. Then, when random access is triggered by the access class, the terminal may trigger a two-step random access process.

In an embodiment, for a terminal in a disconnected state, the triggering condition for two-step random access include at least one of the following: the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance of the terminal to at least one of the satellite, the reference point, and the base station in the NTN does not satisfy the distance condition; the time-domain and/or frequency-domain compensation performed by the terminal satisfy the compensation requirement; and it is determined according to the broadcast message from the base station that there are available resources for two-step random access.

In an embodiment, in response to determining that the buffer status report (BSR) is triggered by the terminal, it may be determined whether the quality of service of the LC that triggers the BSR satisfies the specified quality of service. For example, it may be determined whether the specified parameter in the quality of service of the LC that triggers the BSR satisfies the specified parameter in the specified quality of service. For example, if the specified parameter is time delay, it may be determined whether the time delay in the quality of service of the LC that triggers the BSR is less than the time delay in the specified quality of service. If the former is smaller than the latter, it is determined that the quality of service of the LC that triggers the BSR satisfies the specified quality of service. If the former is not smaller than the latter, it is determined that the quality of service of the LC that triggers the BSR does not satisfy the specified quality of service. When the quality of service of the LC that triggers the BSR does not satisfy the specified quality of service, the uplink transmission may be difficult to satisfy the requirements, and thus a two-step random access process may be triggered.

In an embodiment, in response to determining that the buffer status report (BSR) is triggered by the terminal, it may be determined whether the quality of the channel communicating with the base station satisfies the quality condition. For example, when the power of the received signal on the channel is less than the power threshold, it is determined that the channel quality does not satisfy the quality condition. For example, when the downlink pathloss reference is greater than the threshold value msgA-RSRP-Threshold, it may be determined that the channel quality does not satisfy the quality condition. When the channel quality does not satisfy the quality condition, it is difficult to ensure the communication quality of the uplink transmission, and thus a two-step random access process may be triggered. The power may be characterized by parameters such as reference signal receiving power and reference signal receiving quality.

In an embodiment, in response to determining that the buffer status report (BSR) is triggered by the terminal, it may be determined whether the terminal-specific round-trip delay of the terminal in the non-terrestrial network (NTN) satisfies the delay condition. If the terminal-specific round-trip delay of the terminal in the non-terrestrial network (NTN) does not satisfy the delay condition, for example, if the terminal-specific round-trip delay of the terminal in the non-terrestrial network (NTN) is greater than the preset delay, the communication delay in this case is too large. Thus, a two-step random access process may be triggered to re-establish a connection with the base station. The re-established connection helps to reduce the communication delay.

The terminal-specific round-trip delay may refer to the round-trip delay from the terminal to the ground reference point, or the round-trip delay from the terminal to the ground base station, which may be set as needed.

In an embodiment, in response to determining that the buffer status report (BSR) is triggered by the terminal, it may be determined whether the distance of the terminal to at least one of a satellite, a reference point, and a base station in the NTN satisfies the distance condition. If the distance between the terminal and at least one of the satellite, the reference point, and the base station in the NTN does not satisfy the distance condition, for example, if the distance between the terminal and at least one of the satellite, the reference point, and the base station in the NTN is greater than the preset distance, the communication delay in this case is too large. Thus, a two-step random access process may be triggered to re-establish a connection with the base station. The re-established connection helps to reduce the communication delay.

In an embodiment, in response to determining that the buffer status report (BSR) is triggered by the terminal, it may be determined whether the time-domain and/or frequency-domain compensation performed by the terminal satisfies the compensation requirement. Taking the time-domain compensation as an example, the terminal may pre-compensate (part or all of) the round-trip delay between the terminal and the base station. If the compensation accuracy reaches the preset accuracy, it may be determined that the compensation satisfies the compensation requirement. In this case, the communication based on the compensated time-domain resources helps to ensure the uplink and downlink synchronization. For a two-step random access process that has a higher requirement for the uplink and downlink synchronization, it may proceed smoothly, and thus a two-step random access process may be triggered.

In an embodiment, in response to determining that the buffer status report (BSR) is triggered by the terminal, it may be determined whether the terminal is configured with resources for two-step random access, such as resources dedicated to two-step random access.

Since the terminal is in a disconnected state, the base station generally cannot configure available resources for two-step random access for the terminal through unicast signaling. Therefore, it may inform the terminal whether there are available resources for two-step random access through broadcast messages. The base station may determine according to the broadcast message whether there are available resources for two-step random access. If it is determined according to the broadcast message that the terminal is configured with resources for two-step random access, the two-step random access process may be triggered.

Corresponding to the foregoing embodiments of the random access method, the present disclosure also provides embodiments of a random access apparatus.

FIG. 11 is a schematic block diagram of a random access apparatus according to an embodiment of the present disclosure. The random access apparatus shown in this embodiment may be applied to a terminal, which includes, but is not limited to, mobile phone, tablet computer, wearable device, sensor, Internet of Things device, and other communication device. The terminal may serve as a user equipment to communicate with a base station, and the base station includes, but is not limited to, a base station in a communication system, such as 4G base station, 5G base station, and 6G base station.

As shown in FIG. 11, the random access apparatus may include a processing module 1101.

The processing module 1101 is configured to determine whether the triggering condition for random access is met in response to determining that the buffer status report (BSR) is triggered. For example, the processing module may be a processor or multiple processors working cooperatively in the random access apparatus.

The processing module 1101 is further configured to trigger a random access process in response to determining that the triggering condition for random access is met.

In an embodiment, the processing module is configured to determine whether there are available uplink shared channel (UL-SCH) resources for new transmission; and triggering the random access process in response to determining that there are no available UL-SCH resources for new transmission.

In an embodiment, there are available UL-SCH resources for new transmission, and the processing module is configured to: determine whether the UL-SCH resources satisfy the logical channel priority (LCP) mapping restriction condition of the logical channel (LC) that triggers the BSR; and triggering the random access process in response to determining that the UL-SCH resources do not satisfy the LCP mapping restriction condition of the LC that triggers the BSR.

In an embodiment, the terminal is configured with a configured uplink grant resource, and the processing module is configured to: determine the status of the logical channel scheduling request mask of the LC that triggers the BSR; and triggering the random access process in response to determining that the status of the logical channel scheduling request mask is false.

In an embodiment, the processing module is further configured to trigger a scheduling request (SR) in response to determining that the triggering condition is not met.

In an embodiment, the processing module is configured to: determine whether there are available uplink shared channel (UL-SCH) resources for new transmission; and triggering the SR in response to determining that there are no available UL-SCH resources for new transmission.

In an embodiment, there are available UL-SCH resources for new transmission, and the processing module is configured to: determine whether the UL-SCH resources satisfy the logical channel priority (LCP) mapping restriction condition of the logical channel (LC) that triggers the BSR; and triggering the SR in response to determining that the UL-SCH resources do not satisfy the LCP mapping restriction condition of the LC that triggers the BSR, In an embodiment, the terminal is configured with a configured uplink grant resource, and the processing module is configured to: determine the status of the logical channel scheduling request mask of the LC that triggers the BSR; and triggering the SR in response to determining that the status of the logical channel scheduling request mask of the LC that triggers the BSR is false.

In an embodiment, the triggering condition for random access includes at least one of the following: the LC that triggers the BSR is configured to allow a random access process or a two-step random access process to be triggered when the BSR is triggered; the LC that triggers the BSR is configured to disable the uplink hybrid automatic repeat request (HARQ) retransmission; the quality of service of the LC that triggers the BSR does not satisfy the specified quality of service; the terminal-specific round-trip delay of the terminal in the non-terrestrial network (NTN) does not satisfy the delay condition; the distance between the terminal and at least one of a satellite, a reference point, and a base station in the NTN does not satisfy the distance condition; and the time-domain and/or frequency-domain compensation performed by the terminal satisfies the compensation requirement.

In an embodiment, the triggering condition for random access includes a triggering condition for two-step random access.

In an embodiment, the processing module is configured to trigger a two-step random access process in response to determining that the triggering condition for two-step random access is met.

In an embodiment, the processing module is further configured to trigger a four-step random access process in response to determining that the triggering condition for two-step random access is not met. Alternatively, the processing module is further configured to trigger the SR in response to determining that the triggering condition for two-step random access is not met.

In an embodiment, the triggering condition for two-step random access includes at least one of the following: the LC that triggers the BSR is configured to trigger a two-step random access process when the BSR is triggered; the LC that triggers the BSR is configured to disable the uplink hybrid automatic repeat request (HARQ) retransmission; the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance from the terminal to at least one of a satellite, a reference point, and a base station in the NTN does not satisfy the distance condition; the time-domain and/or frequency-domain compensation performed by the terminal satisfies the compensation requirement; and the terminal is configured with resources for two-step random access.

In an embodiment, the terminal is in a disconnected state, and the processing module is configured to: trigger a two-step random access process in response to determining that the triggering condition for two-step random access is met and that the access class for triggering random access satisfies the target condition; and otherwise, trigger a four-step random access process.

In an embodiment, the target condition includes at least one of the following: it is determined according to a broadcast message from the base station that the access class is configured to adopt two-step random access; and the Access Stratum of the terminal determines according to the instruction from the Non-Access Stratum that the access class is configured to adopt two-step random access.

In an embodiment, for a terminal in a disconnected state, the triggering condition for two-step random access includes at least one of the following: the quality of service of the LC that triggers the BSR does not satisfy the specified quality of service; the channel quality does not satisfy the quality condition; the terminal-specific round-trip delay of the terminal in the non-terrestrial network (NTN) does not satisfy the delay condition; the distance of the terminal to at least one of a satellite, a reference point, and a base station in the NTN does not satisfy the distance condition; the time-domain and/or frequency-domain compensation performed by the terminal satisfies the compensation requirement; and it is determined according to the broadcast message from the base station that there are available resources for two-step random access.

In an embodiment, the BSR is a regular BSR.

Regarding the apparatus in the above embodiments, the specific manner in which each module performs operations has been described in detail in the embodiments of the relevant methods, and will not be described in detail here.

As for the apparatus embodiments, since they basically correspond to the method embodiments, reference may be made to the partial description of the method embodiments for relevant details. The apparatus embodiments described above are only illustrative. The modules described as separate components may or may not be physically separated. The components shown as modules may or may not be physical modules. That is, they may be located in one place, or distributed over multiple network modules. Some or all of the modules may be selected according to actual needs to achieve the purpose of the solution of the present embodiments. Those of ordinary skills in the art can understand and implement without any creative efforts.

An embodiment of the present disclosure also provides a communication device, including: a processor; and a memory, having a computer program stored thereon. When the computer program is executed by the processor, the random access method described in any of the above embodiments is implemented.

Embodiments of the present disclosure also provide a computer-readable storage medium for storing a computer program. When the computer program is executed by a processor, steps in the random access method described in any of the above embodiments are implemented.

As shown in FIG. 12, FIG. 12 is a schematic block diagram of a base station 1200 according to an embodiment of the present disclosure. Referring to FIG. 12, the base station 1200 includes a processing component 1222, a wireless transmit/receive component 1224, an antenna component 1226, and a signal processing portion specific to the wireless interface. The processing component 1222 may further include one or more processors. One of the processors in the processing component 1222 may be configured to interact with the terminal described in any of the above embodiments, for example, to accept the random access process initiated by the terminal.

FIG. 13 is a schematic block diagram of a device 1300 for random access according to an embodiment of the present disclosure. For example, the device 1300 may be a mobile phone, a computer, a digital broadcast terminal, a messaging device, a game console, a tablet device, a medical device, a fitness device, a personal digital assistant, or the like.

Referring to FIG. 13, the device 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls the overall operations of the device 1300, such as operations associated with display, phone call, data communication, camera operations, and recording operations. The processing component 1302 may include one or more processors 1320 to execute instructions for implementing all or part of the steps in the above method. Additionally, the processing component 1302 may include one or more modules that facilitate interactions between the processing component 1302 and other components. For example, the processing component 1302 may include a multimedia module to facilitate interactions between the multimedia component 1308 and the processing component 1302.

The memory 1304 is configured to store various types of data to support operations at the device 1300. Examples of such data include instructions for any application or method operating on the device 1300, contact data, phonebook data, messages, pictures, videos, etc. The memory 1304 may be implemented by any type of volatile or non-volatile storage device, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 1306 provides power to various components of the device 1300. The power supply component 1306 may include a power management system, one or more power sources, and other components associated with generation, management, and distribution of power for the device 1300.

The multimedia component 1308 includes a screen that provides an output interface between the device 1300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide action, but also detect the duration and pressure associated with the touch or slide action. In some embodiments, the multimedia component 1308 includes a front-facing camera and/or a rear-facing camera. When the device 1300 is in an operation mode, such as a shooting mode or a video mode, the front-facing camera and/or the rear-facing camera may receive external multimedia data. Each of the front-facing camera and the rear-facing camera may be a fixed optical lens system or have a focal length and the optical zooming capability.

The audio component 1310 is configured to output and/or input audio signals. For example, the audio component 1310 includes a microphone (MIC), which is configured to receive external audio signals when the device 1300 is in an operation mode, such as call mode, recording mode, and speech recognition mode. The received audio signals may be further stored in the memory 1304 or sent via the communication component 1316. In some embodiments, the audio component 1310 also includes a speaker for outputting audio signals.

The I/O interface 1312 provides an interface between the processing component 1302 and a peripheral interface module. The peripheral interface module may be a keyboard, a click wheel, a button, etc. The button may include, but is not limited to, Home button, Volume button, Start button, and Lock button.

The sensor component 1314 includes one or more sensors that provide various aspects of status assessment for the device 1300. For example, the sensor component 1314 may detect the on/off state of the device 1300, and the relative positioning among components, such as display and keypad of the device 1300. The sensor component 1314 may also detect a change in position of the device 1300 or a component of the device 1300, the presence or absence of the user contact with the device 1300, the orientation or acceleration/deceleration of the device 1300, and the temperature change of the device 1300. The sensor component 1314 may include a proximity sensor, which is configured to detect the presence of nearby objects without any physical contact. The sensor component 1314 may also include a light sensor, such as a CMOS or CCD image sensor, for use in imaging applications. In some embodiments, the sensor component 1314 may also include an acceleration sensor, a gyroscope sensor, a magnetic sensor, a pressure sensor, or a temperature sensor.

The communication component 1316 is configured to facilitate the wired or wireless communication between the device 1300 and other devices. The device 1300 may access a wireless network based on a communication standard, such as WiFi, 2G, 3G, 4G LTE, 5G NR, or a combination thereof. In one embodiment, the communication component 1316 receives broadcast signals or broadcast related information from an external broadcast management system via a broadcast channel. In one embodiment, the communication component 1316 also includes a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology, and other technologies.

In an embodiment, the device 1300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above described method.

In an embodiment, a non-transitory computer-readable storage medium including instructions is also provided, such as a memory 1304 including instructions. The instructions are executable by the processor 1320 of the device 1300 to implement the above described method. For example, the non-transitory computer-readable storage medium may be ROM, random access memory (RAM), CD-ROM, magnetic tape, floppy disk, optical data storage device, etc.

Other embodiments of the present disclosure will be readily apparent to those skilled in the art from consideration of the specification and practice of the content disclosed herein. The present disclosure is intended to cover any variations, uses, or adaptations of the present disclosure that follow the general principles of the present disclosure and include the common knowledge or commonly used technical means in the art that are not disclosed in the present disclosure. The specification and examples are considered as instances only.

It is to be understood that the present disclosure is not limited to the precise structures described above and illustrated in the accompanying drawings, and various modifications and changes may be made without departing from the scope thereof.

It should be noted that in the present application, relational terms such as first and second are only used to distinguish one entity or operation from another entity or operation, and do not necessarily require or imply that any actual relationship or sequence exists between these entities or operations. The terms "comprise", "comprising", or any other variation thereof are intended to cover a non-exclusive inclusion, such that a process, method, article, or apparatus including a list of elements includes not only those elements, but also others elements that are not expressly listed, or elements that are inherent to such process, method, article, or apparatus. Without further limitation, an element defined by the statement of "comprising one" does not exclude the presence of additional identical elements in a process, method, article, or apparatus that includes the stated element.

The methods and devices provided by embodiments of the present disclosure have been introduced in detail above. Specific examples are used in the present specification to illustrate the principles and implementations of the present disclosure. The description of the above embodiments is only used to help understand the methods and the core idea of the present disclosure. At the same time, for those of ordinary skills in the art, there may be changes in the specific implementation and application scope based on the ideas of the present disclosure. In summary, the content of the present specification should not be understood as a limitation of the present disclosure.

The invention claimed is:

1. A random access method, performed by a terminal, comprising:

determining whether the terminal satisfies a triggering condition for random access in response to determining that a Buffer Status Report (BSR) is triggered by the terminal; and triggering a random access process in response to determining that the terminal satisfies the triggering condition for random access, wherein the triggering condition for random access comprises a triggering condition for two-step random access comprising: a Logical Channel (LC) that triggers the BSR is configured to disable an uplink Hybrid Automatic Repeat reQuest (HARQ) retransmission; and the method further comprises:

triggering a two-step random access process in response to determining that the terminal satisfies the triggering condition for two-step random access, and triggering a Scheduling Request (SR) in response to determining that the terminal fails to satisfy the triggering condition for two-step random access.

2. The random access method according to claim 1, wherein triggering the random access process in response to determining that the terminal satisfies the triggering condition for random access comprises:

determining whether there are available Uplink Shared Channel (UL-SCH) resources for new transmission; and triggering the random access process in response to determining that there are no available UL-SCH resources for new transmission.

3. The random access method according to claim 1, wherein in response to determining that there are available UL-SCH resources for new transmission, triggering the random access process in response to determining that the terminal satisfies the triggering condition for random access comprises:

determining whether the UL-SCH resources satisfy a Logical Channel Priority (LCP) mapping restriction condition of the Logical Channel (LC) that triggers the BSR; and triggering the random access process in response to determining that the UL-SCH resources do not satisfy the LCP mapping restriction condition of the LC that triggers the BSR.

4. The random access method according to claim 1, wherein the terminal is configured with a configured uplink grant resource, and triggering the random access process in response to determining that the terminal satisfies the triggering condition for random access comprises:

determining a status of a logical channel scheduling request mask of the LC that triggers the BSR; and triggering the random access process in response to determining that the status of the logical channel scheduling request mask of the LC that triggers the BSR is false.

5. The random access method according to claim 1, wherein triggering the SR in response determining that the terminal does not satisfy the triggering condition comprises:

determining whether there are available Uplink Shared Channel (UL-SCH) resources for new transmission; and triggering the SR in response to determining that there are no available UL-SCH resources for new transmission.

6. The random access method according to claim 1, wherein in response to determining that there are available UL-SCH resources for new transmission, triggering the SR in response determining that the terminal does not satisfy the triggering condition comprises:

determining whether the UL-SCH resources satisfy a Logical Channel Priority (LCP) mapping restriction condition of the Logical Channel (LC) that triggers the BSR; and triggering the SR in response to determining that the UL-SCH resources do not satisfy the LCP mapping restriction condition of the LC that triggers the BSR.

7. The random access method according to claim 1, wherein the terminal is configured with a configured uplink grant resource, and triggering the SR in response determining that the terminal does not satisfy the triggering condition comprises:

determining a status of a logical channel scheduling request mask of the LC that triggers the BSR; and triggering the SR in response to determining that the status of the logical channel scheduling request mask of the LC that triggers the BSR is false.

8. The random access method according to claim 1, wherein the triggering condition for random access further comprises at least one of:

the LC that triggers the BSR is configured to allow a random access process or a two-step random access process to be triggered in response to determining that the BSR is triggered;

a quality of service of the LC that triggers the BSR does not satisfy a specified quality of service;

a terminal-specific round-trip delay of the terminal in a Non-Terrestrial Network (NTN) does not satisfy a delay condition;

a distance between the terminal and at least one of a satellite, a reference point, and a base station in the NTN does not satisfy a distance condition; and at least one of a time-domain and frequency-domain compensation performed by the terminal satisfies a compensation requirement.

9. The random access method according to claim 1, wherein the triggering condition for two-step random access further comprises at least one of:

the LC that triggers the BSR is configured to trigger a two-step random access process in response to determining that the BSR is triggered;

a quality of service of the LC that triggers the BSR does not satisfy a specified quality of service;

a channel quality does not satisfy a quality condition;

a terminal-specific round-trip delay of the terminal in a Non-Terrestrial Network (NTN) does not satisfy a delay condition;

a distance between the terminal and at least one of a satellite, a reference point, and a base station in the NTN does not satisfy a distance condition;

at least one of a time-domain and frequency-domain compensation performed by the terminal satisfies a compensation requirement; and the terminal is configured with resources for two-step random access.

10. The random access method according to claim 1, wherein the terminal is in a disconnected state, and triggering the two-step random access process in response to determining that the terminal satisfies the triggering condition for two-step random access comprises:

triggering the two-step random access process, in response to determining that the terminal satisfies the triggering condition for two-step random access, and that an access class for triggering random access satisfies a target condition; or triggering a four-step random access process, in response to determining at least one of: the terminal does not satisfies the triggering condition for the two-step and the access class for triggering random access does not satisfy the target condition.

11. The random access method according to claim 10, wherein the target condition comprises at least one of:

determining according to a broadcast message from a base station that the access class is configured to adopt two-step random access; and determining by an Access Stratum of the terminal according to an instruction from a Non-Access Stratum that the access class is configured to adopt two-step random access.

12. The random access method according to claim 10, wherein the triggering condition for two-step random access comprises at least one of:

a quality of service of the LC that triggers the BSR does not satisfy a specified quality of service;

a channel quality does not satisfy a quality condition;

a terminal-specific round-trip delay of the terminal in a Non-Terrestrial Network (NTN) does not satisfy a delay condition;

a distance between the terminal and at least one of a satellite, a reference point, and a base station in the NTN does not satisfy a distance condition;

at least one of a time-domain and frequency-domain compensation performed by the terminal satisfies a compensation requirement; and determining according to a broadcast message from a base station that there are available resources for two-step random access.

13. The random access method according to claim 1, wherein the BSR is a regular BSR.

14. A communication device, comprising:

a processor; and a memory, having a computer program stored thereon, wherein the computer program is configured to, when executed by the processor, implement:

determining whether the terminal satisfies a triggering condition for random access in response to determining that a Buffer status report (BSR) is triggered by the terminal; and triggering a random access process in response to determining that the terminal satisfies the triggering condition for random access, wherein the triggering condition for random access comprises a triggering condition for two-step random access comprising: a Logical Channel (LC) that triggers the BSR is configured to disable an uplink Hybrid Automatic Repeat reQuest (HARQ) retransmission; and the computer program is further configured to, when executed by the processor, implement:

triggering a two-step random access process in response to determining that the terminal satisfies the triggering condition for two-step random access, and triggering a Scheduling Request (SR) in response to determining that the terminal fails to satisfy the triggering condition for two-step random access.

15. A non-transitory computer-readable storage medium, having a computer program stored thereon, wherein the computer program is configured to, when executed by a processor, implement:

determining whether the terminal satisfies a triggering condition for random access in response to determining that a Buffer Status Report (BSR) is triggered by the terminal; and triggering a random access process in response to determining that the terminal satisfies the triggering condition for random access, wherein the triggering condition for random access comprises a triggering condition for two-step random access comprising: a Logical Channel (LC) that triggers the BSR is configured to disable an uplink Hybrid Automatic Repeat reQuest (HARQ) retransmission; and the computer program is further configured to, when executed by the processor, implement:

triggering a two-step random access process in response to determining that the terminal satisfies the triggering condition for two-step random access, and triggering a Scheduling Request (SR) in response to determining that the terminal fails to satisfy the triggering condition for two-step random access.

16. The communication device according to claim 14, wherein triggering the random access process in response to determining that the terminal satisfies the triggering condition for random access comprises:

determining whether there are available Uplink Shared Channel (UL-SCH) resources for new transmission; and triggering the random access process in response to determining that there are no available UL-SCH resources for new transmission.

* * * * *